July 27, 1948.  F. E. FREY ET AL  2,445,824
PROCESS FOR ALKYLATING HYDROCARBONS
Filed Feb. 14, 1942
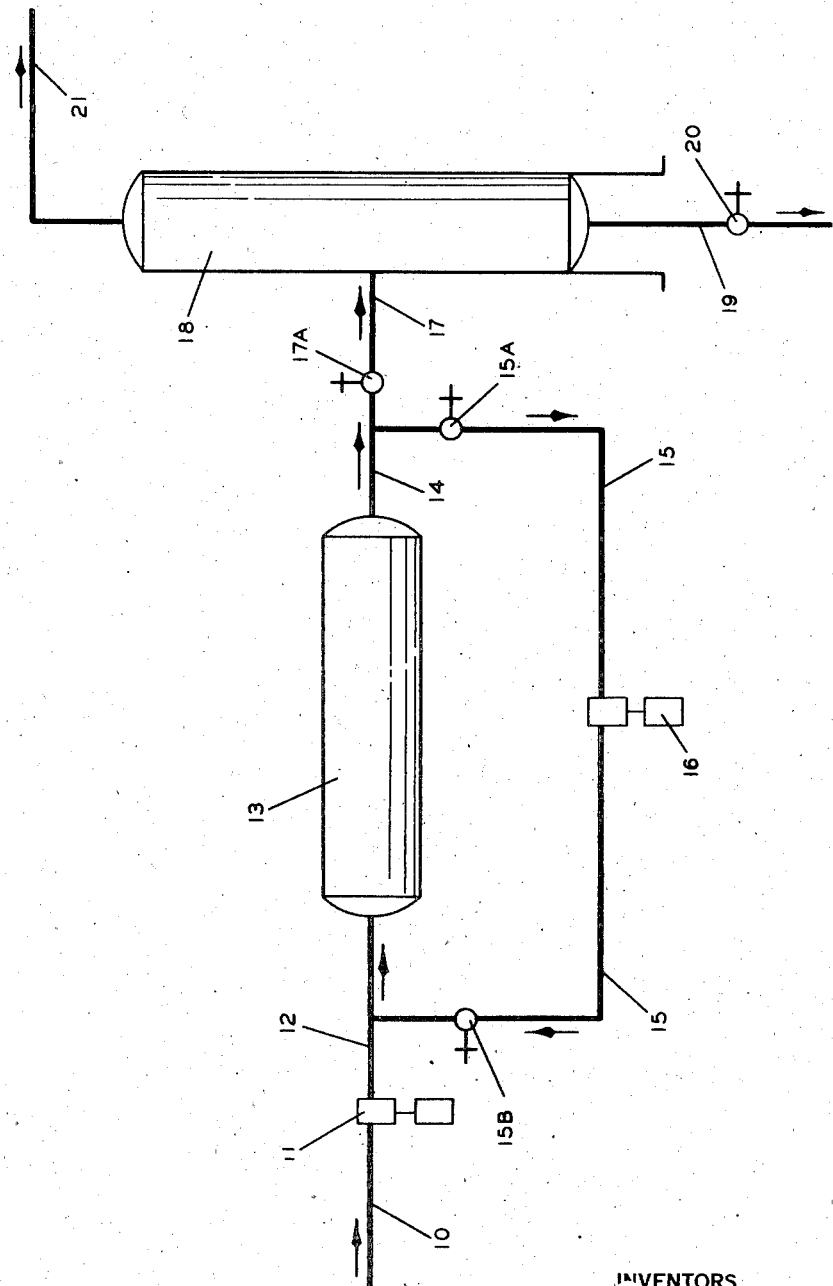
INVENTORS
FREDERICK E. FREY, PAUL V. McKINNEY
WILLIAM H. WOOD
BY
ATTORNEYS Patented July 27, 1948

2,445,824

UNITED STATES PATENT OFFICE 2,445,824

PROCESS FOR ALKYLATING HYDROCARBONS

Frederick E. Frey, Bartlesville, Okla., Paul V. McKinney, Pittsburgh, Pa., and William H. Wood, Cleveland, Ohio, assignors to Phillips Petroleum Company, a corporation of Delaware Application February 14, 1942, Serial No. 430,980

4 Claims. (Cl. 260—683.4)

This invention relates to the manufacture of paraffinic and saturated hydrocarbon oils, and more specifically to the production of paraffinic oils suitable for motor fuel by catalytic synthesis from hydrocarbons of lower molecular weight. More particularly it relates to a process of alkylating isoparaffinic hydrocarbons to produce hydrocarbons suitable for use in an aviation or premium motor fuel. This application is a continuation-in-part of our copending application Serial No. 355,529, filed September 5, 1940, now U. S. Patent 2,296,512, granted September 22, 1942, wherein the use of hydrous alumina and of hydrous silica-alumina combinations is claimed, which is a division of our application Serial No. 87,790, filed June 27, 1936, and now U. S. Patent 2,233,363, granted February 25, 1941.

The conversion of normally gaseous olefins into valuable hydrocarbons of higher molecular weight, suitable for motor fuels, has been effected by heat and pressure, and the use of elevated pressures effecting rapid reaction and nearly complete conversion at temperatures below the pyrolysis range. The polymerization may also be effected with the aid of suitable catalysts at temperatures lower than those required for the purely thermal conversion. The hydrocarbons of higher molecular weight which result, are, in either case, composed of varying proportions of hydrocarbons of several types, a large proportion being olefinic or unsaturated. Such olefinic polymers may be converted into oils of saturated type by means of hydrogenation preferably of the non-destructive type.

The present invention is an improvement of the invention set forth in Frey's application Serial No. 731,920, filed June 22, 1934, which issued May 21, 1935, as Patent 2,002,394, and also is an improvement of the invention set forth in Frey's application Serial No. 12,981, filed March 25, 1935, which is a continuation-in-part of the aforesaid application and which issued January 4, 1938, as Patent No. 2,104,296.

We have found that the union of paraffins with olefins to produce saturated hydrocarbons of high molecular weight can be effected with known polymerization catalysts under new and appropriate conditions and in novel processes which will be presently described. Catalysts effective for the reaction are aluminum chloride chemically combined with an equimolar quantity, more or less, of lithium, sodium, calcium, or potassium chloride, and the corresponding double compounds in which chlorine is replaced by bromine. Other modifying agents added to aluminum chloride or bromide may also be employed. Zinc chloride, zinc bromide, hydrous alumina, and hydrous alumina deposited on or combined with hydrous silica, are likewise effective for catalyzing the reaction. The catalyst is conveniently used in granular form or disposed on an inert granular support. We have found that oils of a saturated type may be produced by reacting together a mixture of paraffins with olefins, provided the ratio of olefins to paraffin is low in the mixture subjected to the action of the catalyst, and our process provides means whereby extensive and practical conversion may be obtained by passing the hydrocarbon stream into contact with the catalyst while maintaining a reaction temperature and while adding olefin in small proportion a plurality of times in the course of the reaction, addition of olefin taking place prior to contact with the catalyst in each addition, whereby added olefin is consumed prior to each subsequent addition of additional olefin. The concentration of olefin present throughout the reaction is in this way maintained at a low value, and the paraffinic reactants at a high value.

With high olefin contents, exceeding 30%, the paraffins enter into reaction to only a limited degree, and the oils produced are largely of the familiar unsaturated type. Accordingly, we maintain olefin concentrations below 20%, and preferably below 10%, in order to obtain efficient cooperative reaction of paraffins and olefins. Olefin concentrations in the paraffinic reactants as low as 0.5% may be maintained economically in the presence of the catalyst by making small olefin additions a sufficiently great number of times in the course of the reaction. The time of residence in the catalyst zone will vary with the manner of disposing catalyst in the reaction chamber and with the particular catalyst employed as will also the temperature of reaction, and both can be readily determined by experiment. The oils produced by this process are predominantly paraffinic, containing 20% or less of unsaturated hydrocarbons and distilled almost wholly in the gasoline range, that is, below 225° C.

Isoparaffinic hydrocarbons in particular, such as isobutane, isopentane and the like may be reacted with olefinic hydrocarbons in the presence of catalysts to produce alkylated isoparaffinic hydrocarbons. For example, isobutane may be reacted with butylene to produce iso-octane, the iso-octane being a typical hydrocarbon present in the desired motor fuel. The reaction is a condensation reaction which is exothermic and takes place in the presence of various catalysts. Although the mechanism of the action of such condensation catalysts is not definitely known or clearly understood, it appears to affect the reactivity both of paraffin hydrocarbons and of olefin hydrocarbons, the principal effect on paraffin hydrocarbons apparently being to lower the temperature at which decomposition will take place but very slowly. With this condition established, the presence of olefins in only very small concentration leads to alkylation as the prodominant reaction.

When reacting isoparaffins a substantial excess of the iso-paraffinic reactant must be maintained so that the olefinic constituent is but a fraction of the isoparaffinic reactant present. In general, in order to obtain a maximum of low-boiling alkylate which is highly paraffinic and has good motor fuel characteristics, and especially the characteristic of high antiknock quality, it is desirable to have the ratio of isoparaffin to olefin extremely high. By the practice of our invention it is practical to have the ratio of isoparaffins to olefins in the presence of the condensation catalyst in excess of 100:1, and practical operation can be obtained in accordance with our invention with this ratio as high as about 200:1 or more, i. e. an olefin concentration as low as 0.5%, as previously mentioned.

The charging stock usually available and used in a commercial plant for practicing our invention is a stabilized hydrocarbon fraction containing chiefly hydrocarbons of four carbon atoms per molecule, with minor amounts of $C_3$ and $C_5$ hydrocarbons. These hydrocarbons are obtained chiefly from the result of cracking operations, natural gasoline and field gases. The cracked hydrocarbons are the principal source of the olefinic hydrocarbons, while the natural gasoline fractions and field gas hydrocarbons are the principal source of the isoparaffinic hydrocarbons. A blend of stabilized condensates from these sources, in which there is a molar excess of isoparaffinic hydrocarbons over the olefinic hydrocarbons, is employed as the charging stock to the alkylation process. The specific gravity of the charging stock is about .6. In order to maintain the desired excess of the isoparaffinic hydrocarbons over the olefinic hydrocarbons in the reaction zone, it has been the practice to fractionate unreacted isoparaffinic hydrocarbons from the reaction product and admix the isoparaffinic hydrocarbon with the incoming feed to increase the proportion of the isoparaffinic hydrocarbon to a point which will give the desired concentration of isoparaffinic hydrocarbons in the reaction zone.

Inasmuch as the alkylation proceeds on a mol to mol ratio, it will be apparent that it has been necessary to handle a large quantity of unreacted isoparaffinic hydrocarbons in the fractionating equipment.

It is an object of the present invention to effect a process for the formation of predominantly saturated oils at relatively low temperatures, below those required for producing such oils by thermal means, or at appreciably lower pressures, with resultant saving in plant construction and operating expense, by effecting catalytically the polymerization, or condensation, reactions which involve the direct union of paraffins and olefins of lower molecular weight than the oils to be produced.

A further object of this invention is to provide a process for the production of oils of essentially saturated type without the step of hydrogenating partly olefinic polymer oils.

A still further object is to provide a process for the conversion of paraffins of low molecular weight into oils of higher molecular weight without the intermediate conversion into simple olefinic hydrocarbons prior to effecting conversion into oils.

Other objects will be apparent upon a further consideration of the following description of this invention.

In general, our invention contemplates a process of alkylating hydrocarbons in which an olefinic hydrocarbon and a paraffinic hydrocarbon are reacted in the presence of a condensation catalyst, particularly one such as has been previously discussed herein, while flowing in a circuit of predetermined time capacity. We charge an isoparaffinic hydrocarbon and an olefinic hydrocarbon, either admixed or separately, so that the charging stock will contain an excess of the isoparaffinic hydrocarbon over that which would react with the olefinic hydrocarbon present.

We maintain a desired molar excess of the isoparaffinic hydrocarbon over the olefinic hydrocarbon during the reaction, by establishing the rate of flow in the circuit which is a function of the excess of the isoparaffinic hydrocarbon over the olefinic hydrocarbon in the charging stock. When the feed contains an increased amount of isoparaffinic hydrocarbons, we maintain the desired molar ratio by reducing the circulation rate. When the quantity of the isoparaffinic hydrocarbon in the feed is reduced, we maintain the desired ratio in the reaction zone by increasing the rate of circulation, as will be seen from a description of the drawing. In this manner, we are enabled to provide a very flexible process capable of taking care of a wide variety of compositions of charging stock by the simple expedient of controlling the rate of flow in the closed circuit and without the necessity of separating isoparaffinic hydrocarbons from the alkylated material and recycling the separated isoparaffinic hydrocarbons to the feed.

It is always necessary to charge a molar excess of the isoparaffinic hydrocarbon over the olefinic hydrocarbon. It is always necessary to have a large excess of isoparaffinic hydrocarbon over the olefinic hydrocarbon in the reaction zone in order to promote the condensation reaction for the formation of the alkylated isoparaffinic hydrocarbons and to mitigate the polymerization of the olefins. Alternatively, we contemplate establishing a process with a very high rate of flow in the closed circuit and taking care of variations in charging stock, that is, controlling the process within minor ranges by the addition of amounts of isoparaffinic hydrocarbons to the feed. We also contemplate the control of the process by varying the circulation rate to accommodate for changes in the composition of the charging stock.

Reference will now be made to the drawing which forms a part of this specification in which is shown, by way of a flow sheet, one arrangement of apparatus for effecting the process.

Referring now to the drawing, olefins and paraffins, which are to be reacted, enter the process together with each other through the conduit 10 and are forced by the pump 11 through the conduit 12 to the reaction chamber 13 wherein the hydrocarbons, comprising paraffins and olefins, are brought into contact with a catalyst suitable for effecting the desired polymerization reaction.

The reacted hydrocarbons are discharged from the chamber 13 into the conduit 14 and divided into two streams, one of which flows through valve 15A into conduit 15 and is forced by pump 16 through valve 15B back into conduit 12 to be reintroduced into the reaction chamber 13. The other stream of reacted hydrocarbons flows through valve 17A and into conduit 17 passing into the separator 18 wherein the hydrocarbons of higher molecular weight produced by the reaction are separated from the lighter hydrocarbons and discharged through conduit 19 controlled by valve 20.

Any unreacted gases will be predominantly paraffinic and may be discharged through conduit 21, and may be reacted with additional olefin or put to any other desired use.

It is to be understood that it may be desirable, or necessary, to recycle the reacted hydrocarbons from chamber 13 back through the conduits 15 and 12 to the chamber again with only a minimum amount of the reacted hydrocarbons passing directly from the chamber 13 through conduits 14 and 17 to the separator 18, in such a case the valve 17A may be set at any desired partially closed position to limit the flow of the reacted hydrocarbons directly from chamber 13 to separator 18.

From the foregoing it should appear obvious that by control of valves 15A and 15B, and valve 17A the flow of the reacted hydrocarbons from the chamber 13 to the separator 18, or the recycling of these hydrocarbons back through the chamber 13 can be readily controlled and regulated.

The paraffins of low molecular weight most suitable for the process, namely butane, pentanes and somewhat heavier paraffins may contain paraffins of lower molecular weight, and may be derived from petroleum, natural gas, or cracking still gases and other sources. Olefins may be derived from cracking still gases, from pyrolysis of petroleum distillates and gases, and from dehydrogenation of ethane, propane and butane. The product of catalytic partial dehydrogenation, containing unconverted paraffin together with the corresponding olefin is particularly suitable for conversion in our process since both paraffin and olefin are present. Such a mixture of paraffin and olefin may be introduced through conduit 10. The olefin depleted paraffin recovered in separator 18 may serve as the paraffinic reactant, and unconverted paraffins in excess are discharged through conduit 21 and thereafter may be subjected to partial dehydrogenation and returned once more to the process by any suitable manner not shown. This process is most advantageously applied to the conversion of isobutane. The reacting of an individual paraffin with an individual olefin yields an oil of relatively simple composition predominating in saturated hydrocarbons whose molecular weight is the sum of that of the paraffin and the olefin.

The rate of feed through conduit 12 should be such that it will completely fill the free space of the catalyst mass within a predetermined time, which is the time of reaction. The time of reaction, of course, will vary, depending upon the temperature, the concentration of one reactant with respect to the other, the thoroughness or degree of mixing, the particular catalyst employed, the state of catalytic activity of the catalyst and the composition of the particular reactants. It will be appreciated, of course, that, in practice, pure reactants alone are not employed, but that other hydrocarbons will be present which may be relatively inert under the reaction conditions, such as normal butane, propane or normal pentane when the conditions are such that primarily an isoparaffin such as isobutane or isopentane is being alkylated. These inert hydrocarbons, which do not take part in the reaction will reduce the concentration of the reactants and affect the size of the reaction chamber. For a commercial plant, a time of reaction varying between about 10 minutes or lower and 45 minutes or higher, could be employed.

EXAMPLE I

Using an arrangement of apparatus such as is shown in the drawing, a mixture containing 9.9 per cent by weight of propylene and 89.85 per cent by weight of isobutane, together with hydrogen chloride in an amount of 0.25 per cent by weight, was charged through conduit 12. This corresponds to a molar ratio of isobutane to propylene of about 6.56:1. The reaction chamber 13 contained a silica-alumina catalyst prepared by contacting hydrous silica gel with an aqueous solution of aluminum chloride, whereby alumina was adsorbed, washing the treated gel chloride free, again treating the gel and washing it with water until free from chloride. The treated and washed gel was dried, before use, in a stream of nitrogen as the temperature was slowly raised to 572° F. and while the temperature was maintained at that value for two hours. The charge was added through conduit 12 at a rate of 1.56 pounds per pound of catalyst per hour, for a contact time calculated to be about 11.9 minutes. The reaction was carried out at 527° F. under a gage pressure of 4,200 pounds per square inch. The recirculation ratio of the hydrocarbon material through conduit 15 and pump 16 was 21:1, and the maximum concentration of propylene in the reaction zone was about 0.53 per cent by weight, resulting in a molar ratio of the isoparaffin to the olefin of about 119:1. That portion of the reaction chamber effluent not recirculated was passed to separating equipment, and the hydrocarbon material subjected to fractionation and analysis. The analysis of the $C_5$ and heavier part of the effluent is shown in Table I.

Table I

| Fraction: | Weight Per Cent |
|---|---|
| Pentenes | 0.2 |
| Isopentane | 12.1 |
| N-pentane | 0.6 |
| Hexenes | 0.6 |
| Hexanes | 13.9 |
| Heptenes | 2.3 |
| Heptanes | 32.8 |
| Octenes | 1.5 |
| Octanes | 9.5 |
| Boiling range 266–392° F | 16.0 |
| Boiling above 392° F | 10.5 |
| | 100.0 |

EXAMPLE II

Another run was made using the same charge stock and apparatus of Example I. The catalyst was prepared by dissolving equimolar quantities of zinc chloride and zinc bromide in ether, adding to the ether solution granular alumina ("Alfrax") in an amount 4 times the weight of the salts. The ether was evaporated and the resulting material treated with a stream of gaseous HBr. The charge was added at a rate of 0.78 pound per pound of catalyst per hour, for a contact time calculated to be about 11.2 minutes. The reaction was carried out at 752° F. under a gage pressure of 4000 pounds per square inch. The recirculation ratio of hydrocarbon material through conduit 15 by pump 16 was 21:1, and the maximum concentration of propylene in the reaction zone was about 0.55 per cent by weight, resulting in a molar ratio of the isoparaffin to the olefin of about 105:1. That portion of the reaction chamber effluent not recirculated was passed to separating equipment, and the hydrocarbon material subjected to fractionation and analysis. The C₅ and heavier material constituted 15.3% by weight of the total hydrocarbon material, which was a yield of 1.7 pounds of liquid hydrocarbon per pound of olefin. The C₅ and heavier fraction had the analysis shown in Table II.

Table II

| Component | Per Cent by Weight | Density | Refractive Index |
|---|---|---|---|
| Pentenes | 2.1 | | |
| Isopentane | 27.9 | | |
| Hexenes | 1.1 | 0.663 | 1.3742 |
| Isohexanes | 17.8 | | |
| Heptenes | 2.2 | 0.682 | 1.3855 |
| Heptanes (185–210.2° F.) | 30.2 | | |
| Octenes | 0.9 | 0.722 | 1.4030 |
| Octanes | 7.6 | | |
| Above Octanes to 392° F | 4.6 | | |
| Residue above 392° F | 5.6 | | |
| | 100.0 | | |

It will be appreciated that an alkylation in which isoparaffinic hydrocarbons and olefinic hydrocarbons are reacted in the presence of a condensation catalyst has occurred in each case and that the molar ratio of the isoparaffinic hydrocarbon to the olefinic hydrocarbon in the reaction zone is in excess of 100:1.

It will also be appreciated by those skilled in the art that various modifications of our invention may be practiced without departing from the spirit of the disclosure or from the scope of the claims. Although a small amount of hydrogen halide has been used in the runs shown in the examples, such material is not always necessary, and we have made successful catalytic alkylation runs without it.

We claim:

1. A process of producing paraffins boiling in the motor fuel range from a lower-boiling isoparaffin and a lower-boiling olefin, which comprises alkylating a low-boiling isoparaffin with an olefin by contacting an admixture of the olefin and the isoparaffin with a condensation catalyst under alkylating conditions, and maintaining the olefin concentration in the paraffinic reactants not greater than about 0.5 per cent at the point where the olefin initially contacts the condensation catalyst.

2. A process of producing paraffins boiling in the motor fuel range from a lower-boiling isoparaffin and a lower-boiling olefin, which comprises alkylating a low-boiling isoparaffin with an olefin by contacting an admixture of the olefin and the isoparaffin with a condensation catalyst under alkylating conditions, and maintaining the molecular ratio of isoparaffin to olefin at the point where the olefin initially contacts the condensation catalyst at least about 100:1.

3. A continuous process of producing paraffins boiling in the motor fuel range from a lower-boiling isoparaffin and a lower-boiling olefin, which comprises continuously alkylating a low-boiling isoparaffin with an olefin by continuously passing an admixture containing the olefin and the isoparaffin into contact with a condensation catalyst under alkylating conditions, and continuously maintaining the olefin concentration in the paraffinic reactants not greater than about 0.5 per cent at the point where the olefin initially contacts the condensation catalyst.

4. A continuous process of producing paraffins boiling in the motor fuel range from a lower-boiling isoparaffin and a lower-boiling olefin, which comprises continuously alkylating a low-boiling isoparaffin with an olefin by continuously passing an admixture containing the olefin and the isoparaffin into contact with a condensation catalyst under alkylating conditions, and continuously maintaining the molecular ratio of isoparaffin to olefin at the point where the olefin initially contacts the condensation catalyst at least about 100:1.

FREDERICK E. FREY.
PAUL V. McKINNEY.
WILLIAM H. WOOD.

REFERENCES CITED

The following references are of record in the file of this patent:

UNITED STATES PATENTS

| Number | Name | Date |
|---|---|---|
| 2,002,394 | Frey | May 21, 1935 |
| 2,104,296 | Frey | Jan. 4, 1938 |
| 2,169,809 | Morrell | Aug. 15, 1939 |
| 2,238,802 | Altshuler et al. | Apr. 15, 1941 |
| 2,296,511 | Frey et al. | Sept. 22, 1942 |
| 2,296,512 | Frey et al. | Sept. 22, 1942 |
| 2,233,363 | Frey et al. | Feb. 25, 1941 |